Nov. 5, 1929.  J. S. THOMPSON  1,734,754
FRICTION BRAKE
Filed May 26, 1926   3 Sheets-Sheet 1
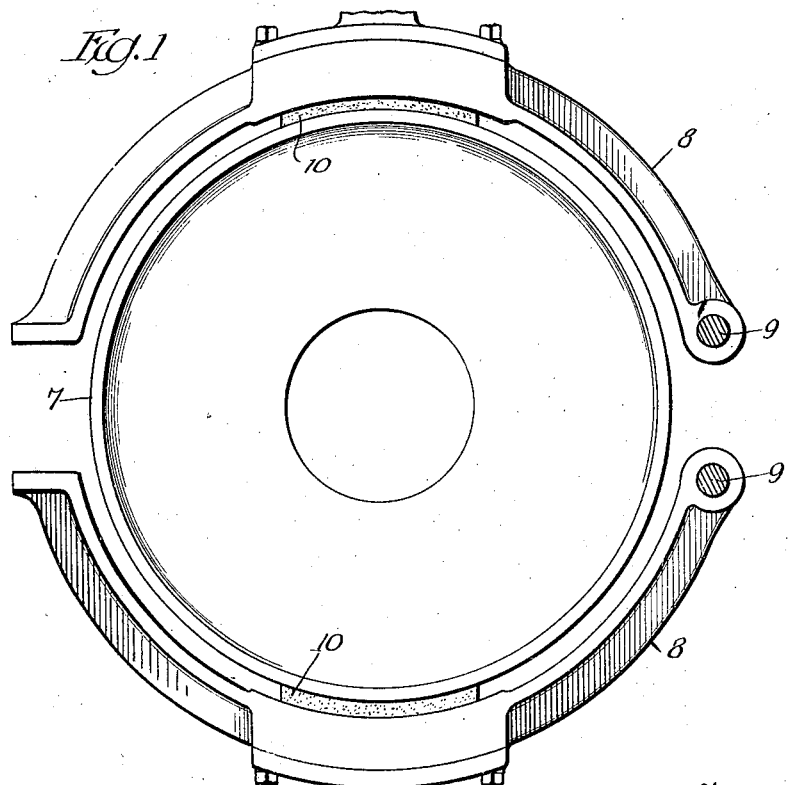
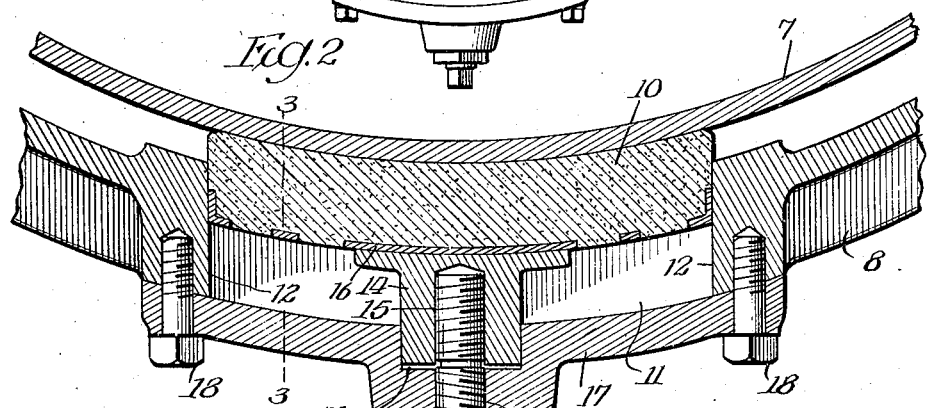
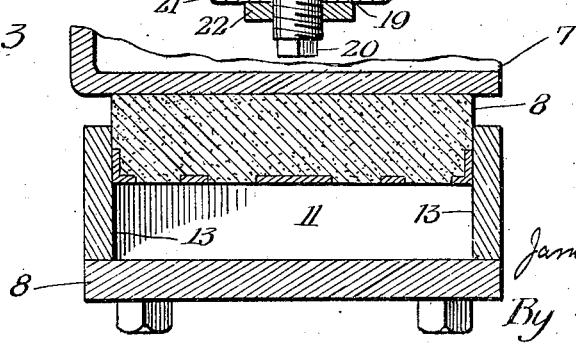
Inventor
James S. Thompson
By Wm O Bell
Atty.

Nov. 5, 1929. J. S. THOMPSON 1,734,754
FRICTION BRAKE
Filed May 26, 1926 3 Sheets-Sheet 2
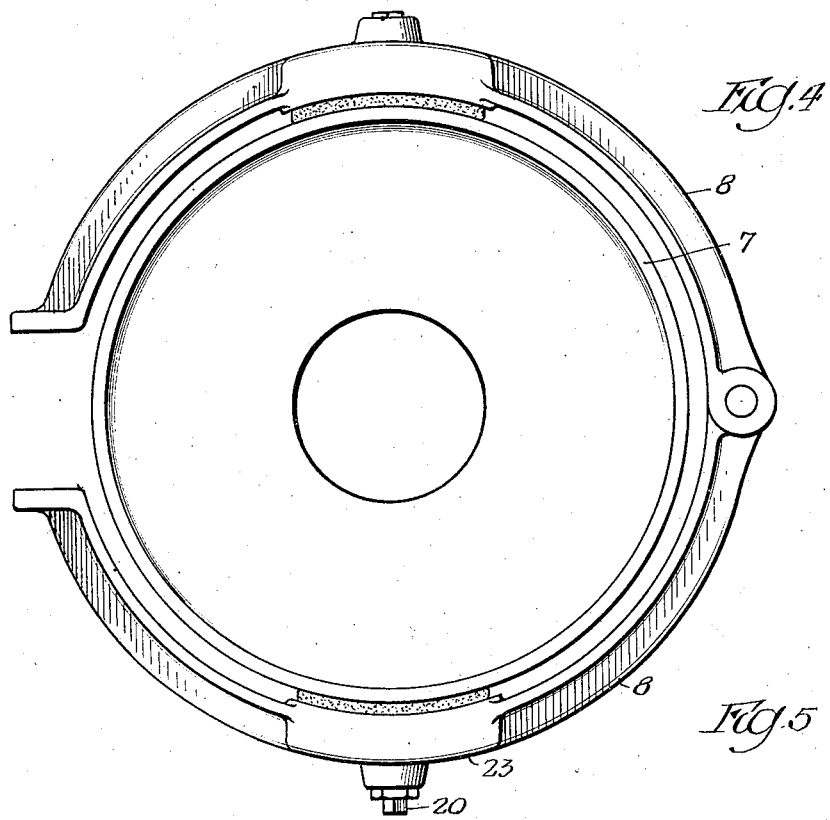
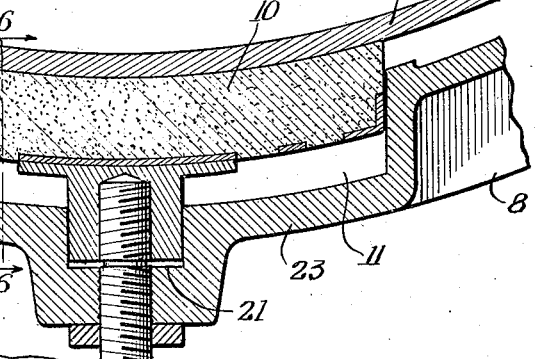
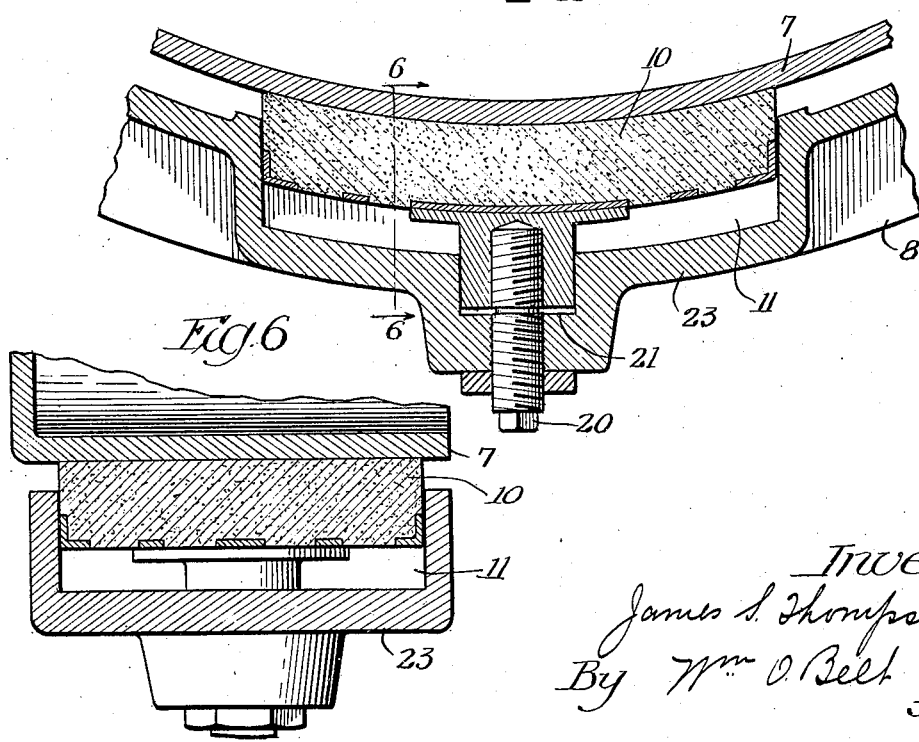

Nov. 5, 1929.  J. S. THOMPSON  1,734,754
FRICTION BRAKE
Filed May 26, 1926   3 Sheets-Sheet 3

Inventor:
James S. Thompson
By Wm O Bell Atty

Patented Nov. 5, 1929

1,734,754

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed May 26, 1926. Serial No. 111,688.

This invention relates to friction brakes and while it is particularly adapted for contracting brakes arranged to make frictional contact with a drum, which is a form of brake commonly employed in automotive vehicles, it is also useful in many other installations as will be apparent to those skilled in the art.

The object of the invention is to provide a novel contracting brake of simple construction which will give desirable braking efficiency and which is easily maintained in proper working condition.

A further object of the invention is to provide a contracting brake with friction shoes which can be easily installed and replaced and which can be adjusted as required to maintain them in proper working position.

The invention has other objects in view which will appear hereinafter in the detail description of selected embodiments of the invention illustrated in the accompanying drawings in which:

Fig. 1 is an elevation partly in section, showing the invention embodied in so much of a brake assembly as is necessary for understanding the invention.

Fig. 2 is an enlarged sectional view showing the adjustable friction shoe and parts of the brake drum and brake head.

Fig. 3 is a transverse sectional view on the line 3—3 of Fig. 2.

Fig. 4 is an elevation showing my invention embodied in another form and in a different brake assembly.

Fig. 5 is an enlarged sectional view of the friction shoe and parts of the brake drum and brake head.

Fig. 6 is a sectional view on the line 6—6 of Fig. 5.

Figure 7:
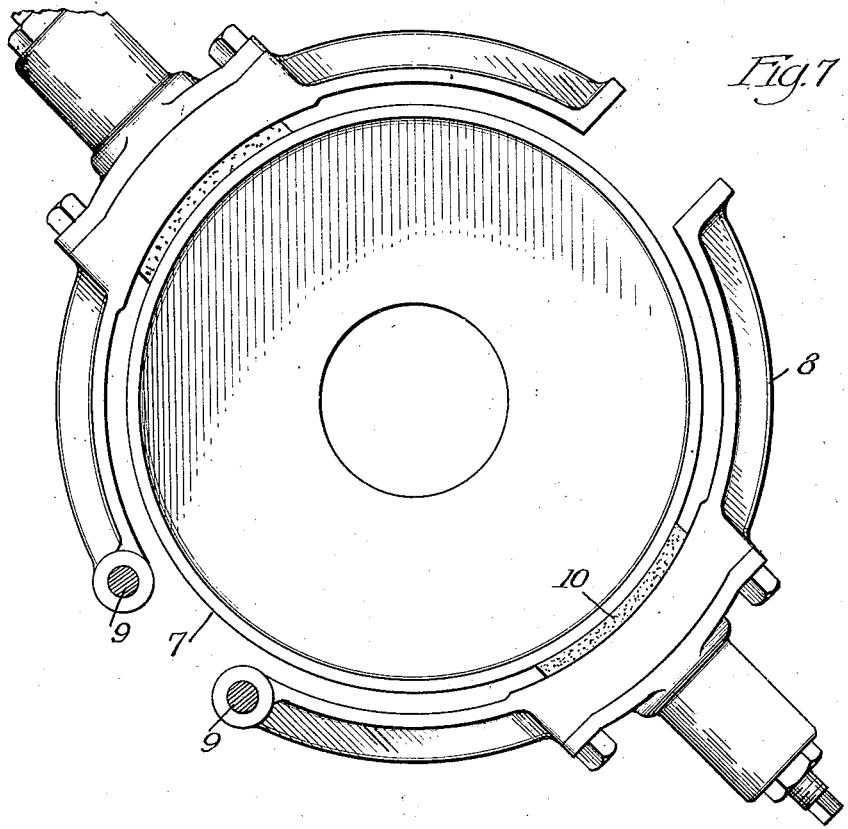
Fig. 7 is an elevation, partly in section, showing another embodiment of the invention.

Referring to the drawings, 7 designates the brake drum which may be of any suitable construction, and 8, 8 are the brake heads which are pivoted at one end on studs 9, 9 forming part of the brake assembly. Any suitable means may be employed in connection with the free ends of the heads for swinging them on the pivot studs to carry the friction shoes 10, 10 into and out of friction contact with the rim of the brake drum.

The usual contracting brake for automotive vehicles comprises a flexible band carrying a fabric lining and arranged to be contracted into frictional contact with the outer surface of the rim of the brake drum, and expanded to release the drum. The mechanism for operating external expanding brakes may vary in construction and since its general operation is so well known I do not deem it necessary to illustrate any such mechanism, reserving to myself the right to embody my invention with any operating mechanism which may be suitable for the purpose. Instead of a flexible band I employ two pivoted rigid heads, each carrying a friction shoe, and I have shown the friction shoes located diametrically opposite each other and substantially midway between the ends of the heads. This I conceive to be a desirable arrangement for many reasons, but I do not limit myself thereto for it will probably be found desirable to dispose the shoes at other positions on the heads and with respect to each other to satisfy conditions as they may be found or may arise. Each head is provided with a socket 11 to receive a shoe 10 which is fixedly or adjustably seated therein; and the shoe and the socket are preferably made to fit as closely as possible consistent with freedom of installation and adjustment of the shoe to prevent lateral or longitudinal movement of the shoe within the socket. Thus it is preferred that the ends of the shoe shall contact with the end walls 12 of the socket and that the sides of the shoe shall contact with the side walls 13 of the socket so that the shoe will always be held in proper position to make contact throughout its contact area with the rim of the drum.

In order that the shoe may always be maintained in proper working position with respect to the drum so that a substantially constant brake condition may be maintained throughout the service of the shoe I provide means for adjusting the shoe from time to time to compensate for wear in service. A lug 14 is rigid with the body of the shoe and it is provided with a threaded opening 15. The lug may be embedded in the body of the shoe or otherwise made rigid therewith, but I prefer to provide the shoe with a steel back 16 and in such case the lug 14 may be made rigid with the back by spot welding or otherwise. The socket has a cover plate 17 which is detachably secured to the head by bolts 18 and this cover has a threaded opening 19. The openings in the lug and in the socket cover have right and left threads to receive a right and left threaded bolt 20 which projects through the socket cover for adjustment. The socket cover is also provided with a recess 21 to receive the outer end of the lug 14 so that in addition to the body of the shoe being guided and held in the socket 11, the lug 14 of the shoe will be guided and held in the recess 21 of the socket cover. A lock nut 22 is provided on the bolt 20 to engage the cover plate for holding the screw in its adjusted position.

This construction provides a simple and convenient means for installing the shoe, adjusting the shoe and replacing the shoe as may be required. The bolts 18 securing the cover plate to the head being removed, the cover plate with the shoe connected by the bolt thereto are withdrawn from the head and the shoe is then removed from the bolt 20. For convenience in manufacture and assembling and disassembling the parts I prefer to make the lug 14 and the recess 21 circular in shape, but they can be made rectangular or any other shape if desired. When they are made circular the shoe can be removed by unscrewing it from the bolt without moving the bolt in the cover plate. Then a new shoe can be screwed on the bolt and the shoe and cover plate replaced upon the head.

In Figs. 4–6 I have shown another embodiment of the invention which does not include the removable cover plate, the bottom 23 of the shoe socket being an integral part of the head. In this construction the head must be released sufficiently to permit the shoe to be removed at the front of the head and in removing the shoe the screw 20 must be operated until the shoe is disconnected therefrom. A new shoe is applied by operating the screw until the shoe is seated in the recess 21. In this construction it will also be more convenient in manufacturing to make the lug and its recess circular in shape, but for all other purposes it could just as well be made in rectangular or other shape for the shoe cannot be turned around on the screw while it is in the socket. In order to install or remove the shoe it is necessary to operate the screw in the head, whereas in the construction of Figs. 1–3 the shoe may be installed upon the cover plate or removed therefrom while the cover plate is disconnected from the head and this can be done by turning the shoe and not turning the screw. For many purposes it will be found convenient to embody the invention in the construction of Figs. 1–3 for convenience in installing and replacing the shoe, but the construction of Figs. 4–6 may be employed whenever it is found suitable for a particular installation.

Figure 8:
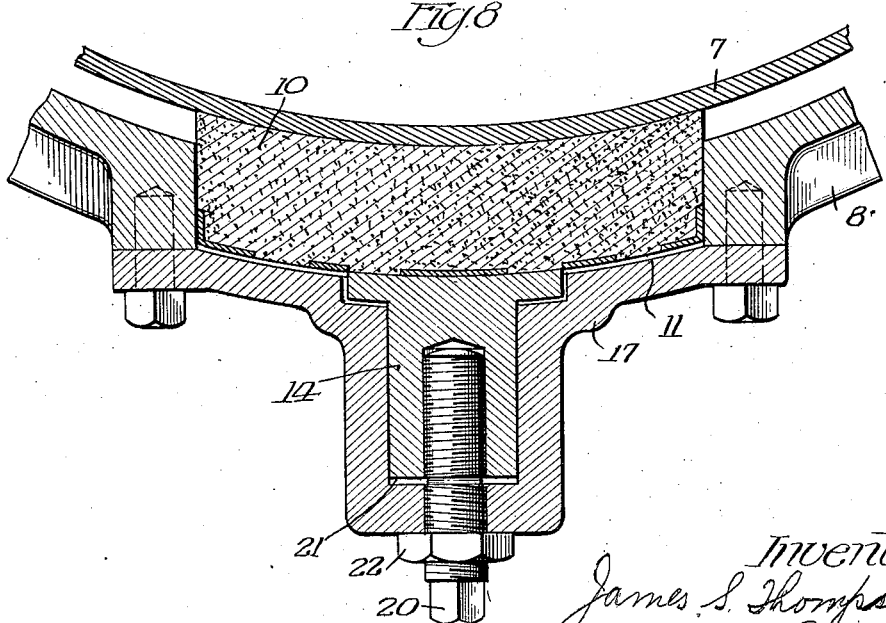
Fig. 8 is an enlarged sectional view of the friction shoe and parts of the brake drum and brake head.

In Figs. 7 and 8 I have shown another embodiment of the invention substantially similar to the construction of Figs. 1–3, but with a deeper recess 21 and longer lug 14 so that a new shoe may be seated in the socket 11 against or substantially against the cover plate 17. This construction enables the use of a thicker shoe or enables a shoe like that of Fig. 2 to be adjusted initially with its wearing face closer to the head.

My invention provides a simple and convenient means for embodying a friction shoe in an external contracting brake, and adjusting means whereby the shoe can be maintained in proper working position relative to the drum or other member to be braked, and for installing and replacing the shoe as may be required. The invention comprises few parts light in weight and simple in construction which can be easily assembled and installed and which can be readily replaced whenever required. There should be no wear upon the heads and the shoes can be easily replaced when worn out. The simple adjustment provided for by my invention is a matter of great importance since it enables the brake to be maintained throughout the service life of the shoe at a substantially constant efficiency and the driver of a vehicle equipped with brakes in accordance with my invention may always feel assured that his brakes are in this condition instead of being in an uncertain condition of efficiency due to wear and deterioration. I prefer to make the body of the shoe of a suitable composition which is wear resistant and heat resistant, but I do not limit the present invention to a friction shoe of any special kind, reserving the right to use any shoe suitable for the purpose. I have described the invention as embodied in an external contracting brake for automotive vehicles, but it can be embodied in other types of brakes for other purposes with equally satisfactory results.

I am aware that changes in the form, construction and arrangement of parts may be made without departing from the spirit or sacrificing the advantages of the invention and I reserve the right to make all such changes as fairly fall within the scope of the following claims.

I claim:

1. In a friction brake, the combination of a member to be braked, a braking member comprising a head having a socket disposed opposite the member to be braked, a friction shoe arranged in said socket with its face adapted to contact with the member to be braked, a lug on said shoe, the body of said shoe having contact with the walls of the socket to maintain the shoe in proper contact relation to the member to be braked, and a member threadedly engaging said lug to effect adjustment of said shoe.

2. In a friction brake, the combination of a member to be braked, a braking member comprising a head having a socket disposed opposite the member to be braked, a friction shoe seated in said socket with its face adapted to contact with the member to be braked, the body of said shoe having its end walls and its side walls in operative relation to the end walls and the side walls of the socket for preventing endwise or lateral movement of the shoe in the socket, and threaded means cooperating with said shoe to move said shoe towards or away from said member to be braked.

3. In a friction brake, the combination of a member to be braked, a braking member comprising a head having a socket disposed opposite the member to be braked, a friction shoe adapted to be inserted bodily in the socket in a direction normal to the length and the width of the socket, a lug fixed to said shoe, and means threadedly engaging said lug for effecting adjustment of said shoe.

4. In a friction brake, the combination of a member to be braked, a braking member comprising a head having a socket disposed opposite the member to be braked, a friction shoe adapted to be inserted in said socket in a direction extending between front and back of the socket, and threaded means extending through said braking member and engaging a lug connected to said shoe for effecting adjustment of said shoe.

5. In a friction brake, the combination of a member to be braked, a braking member comprising a head having a socket disposed opposite the member to be braked, said socket having a removable cover plate forming the back thereof, a friction shoe adapted to be inserted in the socket through the back thereof when the cover plate is removed, and threaded means engaging the cover plate and the shoe for adjusting the shoe relative to said cover plate.

6. In a friction brake, the combination of a member to be braked, a braking member comprising a head having a socket disposed opposite the member to be braked, a friction shoe arranged in said socket with its face adapted to contact with the member to be braked, and interengaging parts at the back of the shoe and the socket, whereby the shoe may be withdrawn from the socket.

7. In a friction brake, the combination of a member to be braked, a braking member comprising a head having a socket disposed opposite the member to be braked, the back of said socket having a recess and the back of the shoe having a lug to engage said recess, and means threadedly engaging the lug to effect adjustment of the shoe.

8. In a friction brake, the combination of a member to be braked, a braking member comprising a head having a socket disposed opposite the member to be braked, the back of the socket having a recess and the back of the shoe having a rigid lug to engage said recess, the sides and ends of the shoe being arranged in operative relation to the sides and ends of the socket, whereby endwise and lateral movement of the shoe relative to the socket is prevented, and means threadedly engaging the lug to effect forward and rearward adjustment of the shoe.

9. In a friction brake, the combination of a member to be braked, a braking member comprising a head having a socket disposed opposite the member to be braked, a removable back rearward of said socket and having a recess, a lug on the back of the shoe engaging said recess, engagement of the sides and ends of the shoe with the side and end walls of the socket and engagement of the lug in the recess preventing endwise and lateral movement of the shoe in the socket, and means threadedly engaging the lug to effect forward and rearward adjustment of the shoe.

10. In a friction brake, the combination of a member to be braked, a braking member comprising a head having a socket disposed opposite the member to be braked, a friction shoe arranged in said socket with its face adapted to contact with the member to be braked, a lug on said shoe, and means threadedly engaging the lug for adjusting said shoe bodily with respect to said member to be braked.

11. In a friction brake, the combination of a member to be braked, a braking member comprising a head having a socket disposed opposite the member to be braked, a friction shoe arranged in said socket with its face adapted to contact with the member to be braked, a removable back for maintaining said shoe in said socket, a lug on said shoe and means engaging the lug and extending through the removable back for adjusting the shoe relative to the member to be braked.

12. In a friction brake, the combination of a member to be braked, a braking member comprising a head having a socket disposed opposite the member to be braked, a friction shoe arranged in said socket with its face adapted to contact with the member to be braked, a removable back on said braking member, and screw means engaging the shoe and extending through the back to adjust the shoe relative to the member to be braked.

13. In a friction brake, the combination of a member to be braked, a braking member comprising a head having a socket and a recess disposed opposite the member to be braked, a friction shoe arranged in said socket with its face adapted to contact with the member to be braked, the back of the shoe having a lug to engage said recess, and adjusting means threadedly engaging said lug and projecting through the back of the braking member and adapted to be operated to adjust the shoe relative to the member to be braked.

14. In a friction brake, the combination of a member to be braked, a braking member comprising a head having a socket disposed opposite the member to be braked, a friction shoe arranged in said socket with its face adapted to contact with the member to be braked, a right and left threaded bolt engaging the shoe and the head and adapted to be operated to adjust the shoe relative to the member to be braked and means for locking the bolt in adjusted position.

15. In a friction brake, the combination of a member to be braked, a braking member comprising a head having a socket disposed opposite the member to be braked, a friction shoe arranged in said socket with its face adapted to contact with the member to be braked, a lug on the back of said shoe, a right and left threaded bolt engaged with the back of the socket and with the lug on the shoe and adapted to be operated to adjust the shoe relative to the member to be braked, and means for locking the bolt in adjusted position.

16. In a friction brake, the combination of a member to be braked, a braking member comprising a head having a socket disposed opposite the member to be braked, a friction shoe arranged in said socket with its face adapted to contact with the member to be braked, the back of said socket being removable from the head and having a recess, a lug on the back of the shoe to engage said recess, and a right and left threaded bolt engaging the back of the socket and the lug on the shoe and adapted to be operated to adjust the shoe relative to the member to be braked.

17. In a friction brake, the combination of a revoluble member to be braked, a pair of rigid brake heads disposed on opposite sides and substantially enclosing said member to be braked, said heads being pivoted at adjacent ends and having sockets disposed between their ends, friction shoes arranged in said sockets and adapted to be carried into and out of braking contact with said member to be braked, and threaded means engaging the shoe and head for adjusting the shoe.

18. In a friction brake, the combination of a revoluble member to be braked, a pair of rigid brake heads disposed on opposite sides and substantially enclosing said member to be braked, said heads being pivoted at adjacent ends and having sockets disposed substantially midway between their ends and in substantially diametrically opposite position with respect to the member to be braked, friction shoes arranged in said sockets and adapted to be carried into and out of braking contact with said member to be braked, and threaded means engaging the shoe and head for adjusting the shoe.

19. A friction brake comprising a brake head, a shoe and a lug arranged in said head, and rigid means threadedly engaging the lug to obtain adjustment of the shoe.

20. A friction brake comprising a brake head, a removable back on said head, a brake shoe disposed in said head, and means threadedly engaging said shoe and said back for effecting adjustment of the shoe.

JAMES S. THOMPSON.